United States Patent Office 3,523,014
Patented Aug. 4, 1970

3,523,014
BORATED MONOALKYL DIHYDROXYBENZENES
Richard J. De Gray, South Euclid, Ohio, assignor to The Standard Oil Company, Cleveland, Ohio, a corporation of Ohio
No Drawing. Filed Nov. 13, 1967, Ser. No. 682,492
Int. Cl. C10l 1/30
U.S. Cl. 44—76  2 Claims

ABSTRACT OF THE DISCLOSURE

Herein are diclosed novel compounds having the following structural formula:

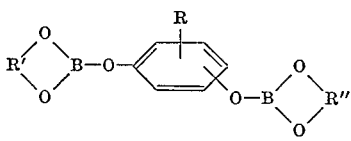

where:

R is selected from the group consisting of hydrogen and straight or branched chain alkyl radicals containing from 1 to 7 carbon atoms; and R' and R" are same or different alpha or beta alkylene radicals containing from 3 to 20 carbon atoms.

These compounds, the borated alkyl dihydroxybenzenes, find utility as microbiocides and as gasoline additives. Additionally, it has been discovered that boration of the dihydroxybenzenes increases their solubility in gasoline to a level not previously possible.

---

The present invention relates to novel borated dihydroxybenzenes. The novel compounds are useful as microbiocides and as gasoline additives. Additionally, boration of hydroquinone enhances solubility of the hydroquinone in gasoline, thus enabling one to dissolve more of the dihydrobenzenes in the form of a borated dihydroxybenzene than was previously possible.

The use of boron compounds as additives to gasoline for increasing the efficiency of combustion and general improvement of operating characteristics is well known in the prior art. U.S. Pat. No. 2,741,548 discloses a form of boron compounds which are sufficiently stable under all of the various manufacturing, storage and use conditions to assure that the boron compound will remain in gasoline and will arrive in the proper form with the fuel in the combustion zone to be effective.

U.S. Pat. No. 1,951,205 discloses the use in gasoline of dihydroxybenzenes, namely hydroquinone, resorcinol, and pyrocatechol, as color stabilizers and color restorers. In addition to being color stabilizers and restorers, the dihydroxybenzenes are good ignitability additives.

This invention relates to a group of novel compounds which combine the favorable attributes of dihydroxybenzenes and the boron compounds. These novel compounds are embraced by the following structural formula:

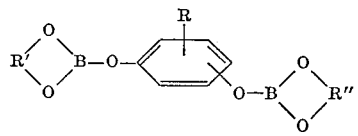

where:

R is selected from the group consisting of hydrogen and straight or branched chain alkyl radicals containing from 1 to 7 carbon atoms, and preferably from 2 to 5 carbon atoms; and R' and R" are same or different alpha or beta alkylene radicals containing from 3 to 20 carbon atoms, and preferably, R' and R" are same beta alkylene radicals containing from 3 to 10 carbon atoms.

The novel compounds can be prepared in the following three ways:

(1) Charging to a reactor 2 moles of an alpha or beta alkylene diol, 1 mole of a dihydroxybenzene, 2 moles of orthoboric, metaboric acid, or 1 mole of boric oxide, and a solvent such as toluene. Six moles of water formed in the reaction are removed by azeotropic distillation. This reaction is depicted below.

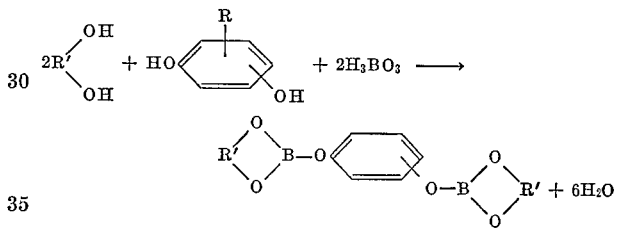

(2) Charging reactor with 2 moles of a glycol orthoborate, 1 mole of a dihydroxybenzene and a solvent such as toluene. Two moles of water formed are removed by azeotropic distillation. Thus, the following reaction:

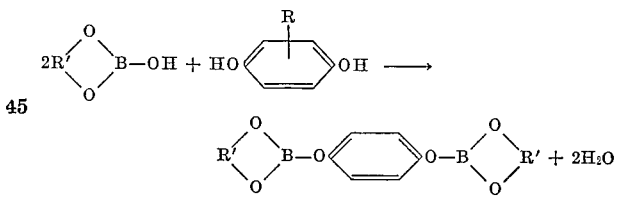

(3) Charging reactor with 1 mole of a glycol pyroborate and 1 mole of a dihydroxybenzene with a solvent and removing 1 mole of water formed.

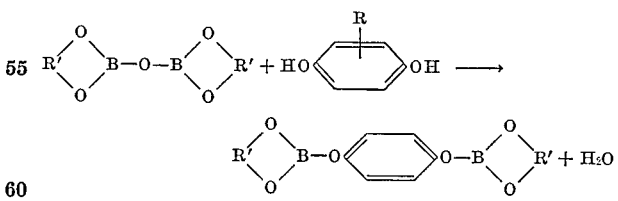

Reactions involving hydroquinone with hexylene glycol, or hexylene glycol orthoborate, or hexylene glycol pyroborate, yielded products which showed identical infra-red spectra. Although the product in the above methods of preparation is shown as having the same alkylene radical at both ends of the molecule, it is possible to produce a product wherein the alkylene radicals are different. This can be accomplished, for example, by reacting two different glycols, as in reaction (1) above. Furthermore, the glycol borate derivatives of resorcinol and pyrocatechol can only be produced by the route of reaction (1). Only glycol borate derivatives of hydroquinone can be produced by any of the three reactions.

EXAMPLE I

In accordance with reaction (1) above, 23.6 grams of 1,1-dimethyl, 3-methyl propanediol-1,3, 11 grams of hydroquinone, and 12.4 grams of boric acid were charged to a reaction vessel fitted with a stirrer and containing 80 mls. of toluene. The reaction vessel was connected to a condenser and the condenser itself was fitted with a trap for collecting water. The contents of the reaction vessel were heated by means of a heating mantle to the toluene-water azeotrope temperature, i.e., 84.1° C. The reaction was continued until the stoichiometric amount of water was collected. In reality, 10.6 grams of water were actually collected instead of the stoichiometric amount of 10.8 grams.

The reaction product was separated from toluene by simple distillation under a blanket of nitrogen. Toluene, being the lighter constituent, distilled over, leaving the reaction product behind. The reaction product was a yellowish, viscous liquid at room temperature. On cooling, the viscosity increased and crystallization appeared to start at about 3° C. White crystals precipitated upon exposure of the reaction product to a moist atmosphere. The structure of the product was confirmed by infra-red spectrum.

The predominant product had the following postulated structural formula which is consistent with the infra-red spectrum analysis:

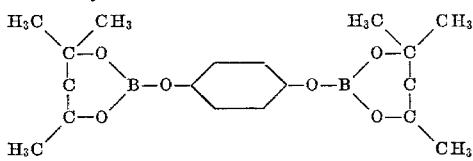

EXAMPLE II

In a similar manner as in Example I, 0.2 mole (26.63 grams) of 1,1-dimethyl, 3-methyl propanediol-1,3, 0.2 mole (12.37 grams) of boric acid, and 0.1 mole (16.62 grams) of t-butyl hydroquinone were added to a reaction vessel containing 80 mls. of toluene. In accordance with the procedure of Example I, 10.7 grams of water were collected. This compares very favorably with the stoichiometric amount of 10.8 grams of water which would have to be removed to obtain a completely esterified product.

Examples of other alkylene glycols which were used as reactants to produce borated dihydroxybenzenes are the following:

(a) 1-methyl propanediol-1,3
(b) 2-ethyl, 2-butyl propanediol-1,3
(c) 1,1-dimethyl, 3-methyl propanediol-1,3
(d) 2-ethyl hexanediol-1,3
(e) a mixture of octylene glycols U.S. Pat. No. 2,741,548 discloses many other candidate alpha and beta alkylene glycol borates.

Esterification of both hydroxyl radicals on hydroquinone has been declared to be impossible, Berichte 93, page 1078, 1960. The structure of the novel compounds, however, is in accordance with the stoichiometry of their preparation. Using method (1) with the hexylene glycol and boric acid, all three dihydroxybenzenes yielded 6 moles of water of reaction, proving that both (OH) groups were involved.

Careful measurement of the water formed in these reactions gives valuable insight into the probable structure of the products. The following discussion centers around method (2), although similar arguments can be based on methods (1) or (3). Hydroquinone is used for illustrative purposes.

The postulated reaction in accordance with method (2) is:

(A)

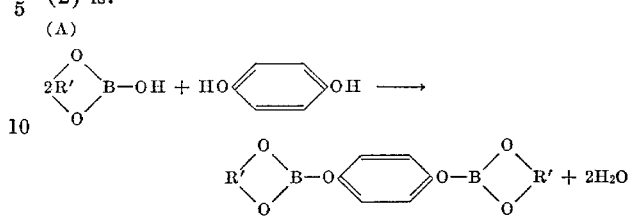

Thus, as above reaction shows, 1 mole of hydroquinone should yield 2 moles of water. If only one (OH) group were involved, as claimed in the Berichte article cited earlier, the expected reaction would be:

(B)

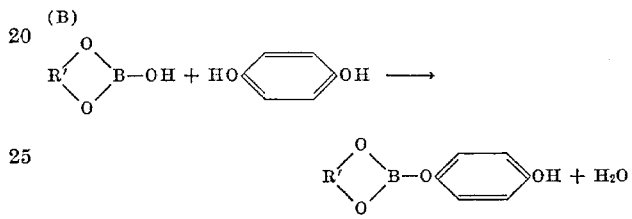

in which case, 1 mole of hydroquinone would react with only 1 mole of the alkylene glycol borate to produce only 1 mole of water. If 2 moles of alkylene glycol borate were to be charged, in accordance with Equation (A) above, the second mole of the alkylene glycol borate would be left unreacted and so would condense with itself under the azeotropic conditions, as follows:

(C)

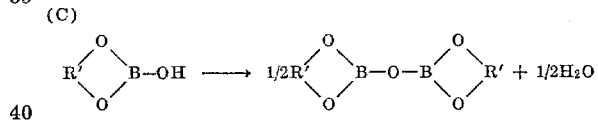

in which case, the total evolution of water would be 1.5 moles per mole of hydroquinone. If the hydroquinone did not react at all, the 2 moles of alkylene glycol borate originally charged would self-condense Equation (C) and would yield 1 mole of water.

In the above experiments, on the basis of 0.2 mole of hydroquinone or other dihydroxybenzene charged, the water corresponding to Equation (A) would be 7.2 grams, Equations (B) and (C) combination would yield 5.4 grams, and Equation (C) alone, 3.6 grams. Repeat preparations gave water yields agreeing within 0.2 grams of 7.2, showing that the three alternate routes, Equations (A), (B), and (C), can be distinguished clearly, except for the combination of Equations (A) and (C), which would give a total water yield resembling that of Equations (B) and (C). This logical analysis shows that Equation (A) is unique; 7.2 grams of water means that all available (OH) groups have been esterified.

As has been shown, a pure product should have all of its (OH) groups esterified, however, upon exposure to anything but bone-dry air, another reaction occurs:

(D)

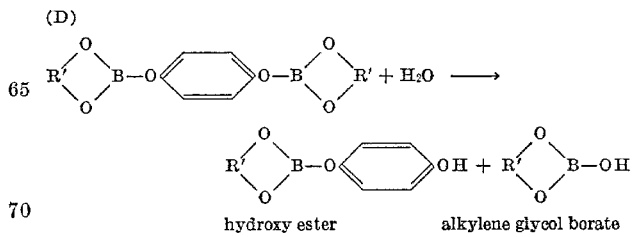

hydroxy ester     alkylene glycol borate

The structure of the hydroxy ester has been confirmed by infra-red analysis. There is, of course, an (OH) band in this spectrum. The product of equation (D) contains this hydroxy ester as well as the alkylene glycol borate, which also contains an (OH) group. The product of equation (A) should not contain any (OH) groups if pure, but equation (D) is so liable to occur on exposure to the atomsphere that some (OH) bands must be expected in any sample. Even if a pure borated dihydroxybenzene were submitted for infra-red analysis, exposure during the running of the spectrum would produce some (OH) groups. This is not a peculiarity of the borated dihydroxybenzenes. Pyroborates having the following formula:

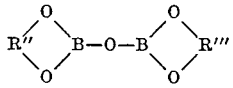

where:
R" and R''' are same or different, but preferably same, alpha or beta alkylene radicals containing from 3 to 20 carbon atoms and preferably, from 3 to 10 carbon atoms react with atmospheric moisture to form some alkylene glycol borates of the formula

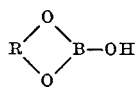

with the attendant (OH) group.

It should be expected that all samples of borated dihydroxybenzenes will show some (OH) bands. Whether the intensity of the bands indicates the (OH) as an impurity or as a major ingredient would depend on the history of the sample. Quantity of (OH) groups in the product would depend on degree of exposure of the product to the moisture. However, strong new bands and a band due to the parasubstituted benzene ring would indicate formation of one of the novel compounds.

As was described earlier, dihydroxybenzenes are known gasoline additives. Although they are only slightly soluble in gasoline, the prior art discloses that they can be introduced into gasoline as solutions of isopropyl alcohol.

It has now been discovered that boration of dihydroxybenzenes increases their solubility in gasoline. For example, borated hydroquinone, prepared from the hexylene glycol (BHQ-6), serves to dissolve at least 76 p.p.m. of hydroquinone. Since the gasoline can hold no more than 25 p.p.m. of hydroquinone per se, the boration at least trebles the solubility.

BHQ-8, prepared from the octylene glycol, gave a threshold solubility at 20 p.p.m. of boron corresponding to just over 100 p.p.m. of hydroquinone. BHQ-9 gave threshold solubility at 30 p.p.m. of boron, or about 150 p.p.m. of hydroquinone.

It is apparent that boration of hydroquinone enhances its solubility in gasoline, and the more carbon atoms in the glycol, the greater the solubility of hydroquinone in gasoline. It was soon learned, however, that BHQ whether −6, −8, or −9, was difficult to handle, exposure to atmospheric humidity producing a white precipitate that was soluble in alcohol but not in gasoline. Infra-red examination of the precipitate showed it to be an ester, the logical source of which is Equation D.

If Equation D were correct, addition of a dehydrating agent would inhibit such reaction. Since pyroborates are exceptional dehydrating agents, hexylene glycol pyroborate or HGB of the following formula:

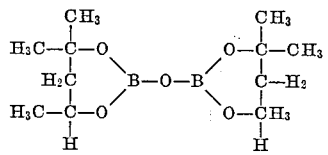

was tried with BHQ in gasoline and found to impart stability thereto. In addition to stabilizing BHQ, HGB raised the threshold solubility of the BHQ considerably. For example, 1 mole of HGB per 1 mole of BHQ-6 mixture raised the threshold solubility from 76 p.p.m. hydroquinone to 150 p.p.m.

Since it is known that boron quenches ignitability of gasoline, the next step was to test the novel compounds to determine the extent of the quenching effect.

The gasoline in which the additives were tested had the following specifications:

| | |
|---|---|
| Gravity, ° API | 63.0 |
| SEB, (percent) | 0.25 |
| Distillation, ° F. | 97 |
| IBP | 95 |
| 2% | 104 |
| 10% | 122–118 |
| 20% | 145 |
| 30% | 173 |
| 40% | 202 |
| 50% | 228–223 |
| 60% | 249 |
| 70% | 271 |
| 80% | 301 |
| 90% | 338 |
| 95% | 375 |
| EP | 427 |
| Residue, (percent) | 1 |
| Loss, (percent) | 2 |
| RVP, lbs. | 10.6 |
| F–1 octane | 100.5 |
| F–2 octane | 93.8 |
| Saturates | 69.5 |
| Olefins | 10.5 |
| Aromatics | 20.0 |
| TEL, ml./gal. | 2.55 |

Samples containing the desired additives were prepared and the Starfire acceleration tests were run with the indicated results below.

TABLE I

Ignition effect,
Additive package: percent toluene equivalent
(1) 4 p.p.m. N as 2CN _____ +6.40
(2) 4 p.p.m. N as 2CN, 10 p.p.m. B as HGB _ −1.73
(3) 4 p.p.m. N as 2CN, 5 p.p.m. B as BHQ–6,
  5 p.p.m. B as HGB _____ +1.80
(4) 4 p.p.m. N as 2CN, 2 p.p.m. B as BHQ–6,
  8 p.p.m. B as HGB _____ 5.78

Although the 2 to 8 mixture did not restore the original reading, it came close. In a similar set of experiment (see Table II), the 2 to 8 mixture not only restored the loss, but gained 2.1 percent toluene equivalent.

TABLE II

Ignition effect,
Additive package: percent toluene equivalent
(1) 4 p.p.m. N as 2CN+5 p.p.m. N as
  DCHNA _____ +7.10
(2) 4 p.p.m. N as 2CN+5 p.p.m. N as
  DCHNA, 10 p.p.m. B as HGB _____ +3.60
(3) 4 p.p.m. N as 2CN+5 p.p.m. N as
  DCHNA, 5 p.p.m. B as BHQ–6, 5 p.p.m.
  B as HGB _____ +1.20
(4) 4 p.p.m. N as 2CN+5 p.p.m. N as
  DCHNA, 2 p.p.m. B as BHQ–6, 8 p.p.m.
  B as HGB _____ 9.20

In the above tables, 2 CN denotes dimethyl dicoco ammonium nitrite; HGB is the hexylene glycol borate; DCHNA is the acronym of dicyclohexyl nitrosoamine; and toluene equivalent indicates improvement in acceleration which can be computed from the relationship that 15 percent of toluene in gasoline imparts an acceleration improvement of 12 H.P.

The novel compounds are also exceptional microbiocides. Microbiological tests were carried out to show the effect of the novel compounds on microorganisms which are usually associated with gasoline fuels. The test procedure is fully described in Society for Industrial Microbiology publication entitled "Proposed Procedures for Microbiological Examination of Fuels." The particular procedure adapted begins on page 17 of said publication and is entitled "Culture Techniques for Total Counts of Water and Interface Samples." Nutrient agar was used as the appropirate liquified medium for bacteria, while Sabourand's agar was used for fungi. The samples consisted of 50 mls. of commercial gasoline and 20 mls. of water. Results of the tests show that a package consisting of 10 p.p.m. of boron as HGB with 4.3 p.p.m. of hydroquinone in the form of a borated hydroquinone is an excellent microbiocide, while 10 p.p.m. of boron as HGB without the borated hydroquinone is useless.

I claim:
1. An additive concentrate for gasoline comprising a mixture of a compound having the following structural formula:

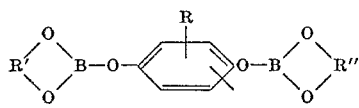

where R is selected from the group consisting of hydrogen and alkyl radicals containing from 1 to 7 carbon atoms and R' and R" are alkylene radicals containing from 3 to 20 carbon atoms, and the dihydroxy ester of said compound, said concentrate being added to gasoline to provide from about 5 to about 300 parts per million boron in said gasoline.

2. An additive concentrate for gasoline comprising a compound having the following structural formula:

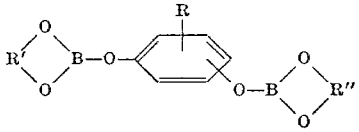

where R is selected from the group consisting of hydrogen and alkyl radicals containing from 1 to 7 carbon atoms and R' and R" are alkylene radicals containing from 3 to 20 carbon atoms, and an alkylene pyroborate of the following formula:

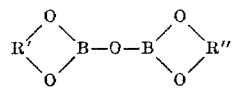

where R' and R" have the same connotation as hereinbefore, said concentrate being added to gasoline to provide from about 5 to about 300 parts per million boron in said gasoline.

UNITED STATES PATENTS

References Cited

| | | | |
|---|---|---|---|
| 2,741,548 | 4/1956 | Darling et al. | 44—76 |
| 3,009,799 | 11/1961 | Dykstra | 44—76 |
| 3,136,808 | 6/1964 | Emrick | 44—76 |
| 3,347,646 | 10/1967 | De Gray et al. | 44—76 |

DANIEL E. WYMAN, Primary Examiner

Y. H. SMITH, Assistant Examiner

U.S. Cl. X.R.
252—386